March 4, 1969   N. A. OTTO   3,430,991
SELF-HOLDING NUT FOR WALL OF ENCLOSURE
Filed June 15, 1967
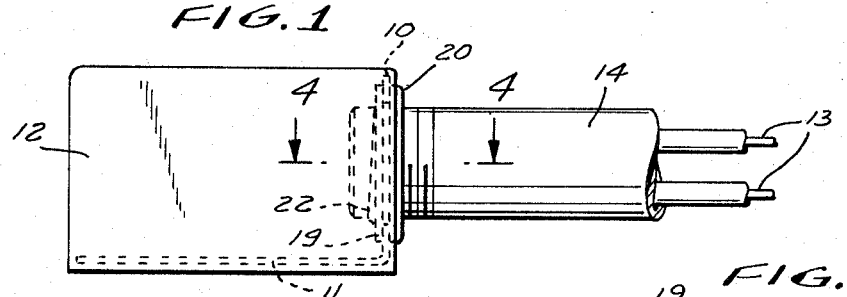
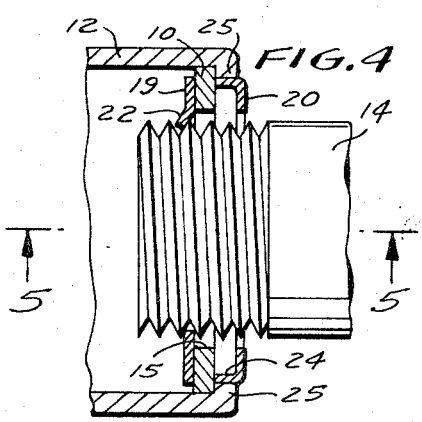
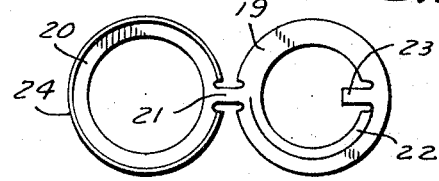
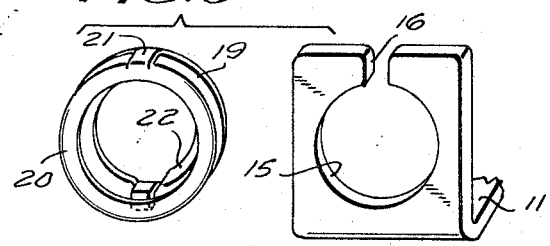
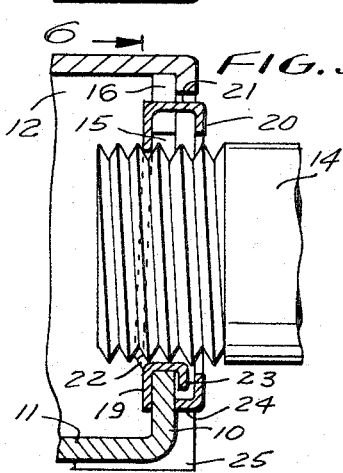
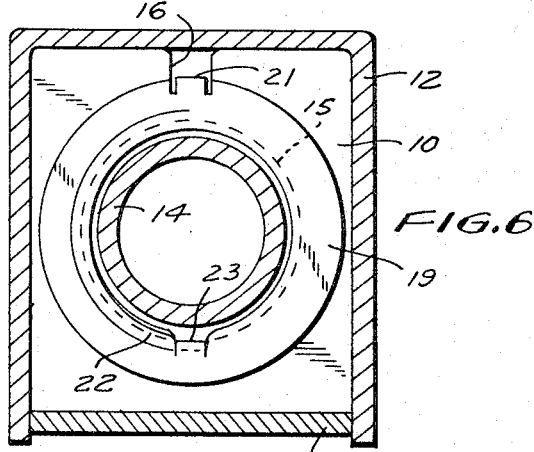
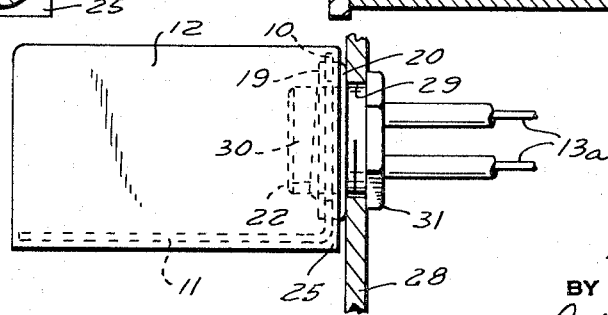
INVENTOR:
NOEL A. OTTO
BY
*Breitenfeld & Levine*
ATTORNEYS

United States Patent Office 3,430,991
Patented Mar. 4, 1969

1

3,430,991
SELF-HOLDING NUT FOR WALL OF ENCLOSURE
Noel A. Otto, Whippany, N.J., assignor to Automatic Switch Company, a corporation of New York
Filed June 15, 1967, Ser. No. 646,265
U.S. Cl. 285—206    6 Claims
Int. Cl. F16l *15/00;* H02g *3/18;* F16b *39/00*

ABSTRACT OF THE DISCLOSURE

Ring having internal screw thread located adjacent inner face of wall of housing and engages threaded fitting extending through hole in wall. Second ring adjacent outer face of wall has inturned peripheral rim to space ring away from wall a distance greater than length of overhang of housing cover past the wall. Integral web joins the two rings, web fitting into identation in edge of wall to prevent rotation of rings. Integral tab projects from one ring toward the other and engages edge of hole.

---

This invention relates to a self-holding nut of the type which is associated with a hole in the wall of an enclosure, so that a threaded fitting can be secured within the hole without the necessity of access to the interior of the enclosure.

It is an object of the invention to provide such a nut which can be made inexpensively from a single metal stamping, and which can be rapidly assembled with a housing wall without the use of tools.

It is another object of the invention to provide such a nut having an external part, a portion of which is spaced outwardly from the outer face of the housing wall, so as to prevent contact between the housing cover which overhangs the wall and a surface against which the housing is mounted.

It is a further object of the invention to provide such a nut wherein the external part also serves as a lock washer.

To achieve these and other objects, the invention provides two rings adapted to sandwich the housing wall between them, the rings surrounding a hole in the wall within which a threaded fitting is to be secured. The inner annular edge of the inner ring is formed with a screw thread cooperable with the external thread of the fitting. The outer ring is formed with a peripheral rim projecting toward and engaging the outer face of the wall. The rim serves to space the body of the outer ring from the wall so that the outermost face of the ring extends outwardly beyond the edge portion of the housing cover which overhangs the wall. Consequently, if the housing is mounted against a surface by means of the threaded fitting, the outer ring will be pressed against the mounting surface and not the housing cover. Furthermore, in such a case, the inherent resilience of the outer ring causes it to serve as a lock washer.

An integral web joins the two rings, and the web is positioned within an indentation in an edge of the housing wall so as to prevent rotation of the rings as the fitting is screwed into the inner ring. In addition, one of the rings is formed with a tab projecting toward the other, the tab engaging an edge of the hole in the housing wall and thereby serving to maintain the nut in proper position until the fitting is threaded into it.

Additional features of the invention will be apparent from the following description in which reference is made to the accompanying drawings.

In the drawings:

FIG. 1 is a side elevational view of a housing joined to a threaded conduit by means of a nut according to this invention;

2

FIG. 2 is a face view of the nut before the connecting web is bent to bring the rings into spaced parallel planes;

FIG. 3 is an exploded perspective view of the nut and a housing wall with which it can be associated;

FIG. 4 is a fragmentary cross-sectional view on line 4—4 of FIG. 1;

FIG. 5 is a cross-sectional view on line 5—5 of FIG. 4;

FIG. 6 is a cross-sectional view on line 6—6 of FIG. 5; and

FIG. 7 is a side elevational view of a housing joined to a support panel by means of a threaded fitting cooperating with a nut according to this invention.

The housing or enclosure with which the present invention is employed may be of various kinds and may serve many purposes. For the sake of illustration, the housing shown in the drawings may be considered one which encloses a solenoid and part of an armature (not shown) of the type used to control the operation of a valve (not shown). The housing includes a wall 10 and floor 11, integrally formed, and a cover 12 which snaps over the wall and floor to enclose the solenoid. Electricity for energizing the solenoid within the housing is supplied by a pair of electrical conductors 13.

In FIGS 1–6, the conductors 13 are arranged within a protective conduit 14 provided with a threaded end for connection to the housing. The wall 10 of the housing is furnished with a central hole 15 a little larger than the external diameter of the conduit 14. Furthermore, the upper edge of the wall 10 is formed with an indentation which in the present example is a slot 16 extending from the upper edge to the hole 15. The nut of the present invention is associated with the wall 10 for the purpose of securing the threaded end of conduit 14 to the wall.

The nut chosen to illustrate this invention comprises two rings 19 and 20, arranged in spaced-apart parallel planes, and joined by a web 21. The rings and web are advantageously integrally formed from sheet metal by a stamping operation. When the nut is assembled with the wall 10, the ring 19 lies adjacent to the inner face of the wall, and the ring 20 is adjacent to the outer face of the wall. The web 21 extends between the rings through the slot 16. The inner annular edge of the inner ring 19 is bent to form a partial screw thread 22 adapted to cooperate with the threaded end of the conduit 14. In addition, an L-shaped tab 23, integral with the ring 19, extends from the ring 19 toward the ring 20. The tab 23 is shown in FIG. 2 before being bent into its final form as shown in FIG. 5. The tab 23 overlies an edge of the hole 15 and thereby maintains the central openings in the rings 19 and 20 in alignment with the hole 15 until the conduit 14, or some other threaded fitting, engages the ring 19.

The outer ring 20 is formed with a peripheral rim 24 projecting toward the ring 19. The free edge of the rim 24 engages the outer face of the wall 10 and serves to space the annular face of the ring 20 away from the wall. The width of the rim 24 is such that the ring 20 is spaced from the wall 10 a distance greater than the amount by which the edge 25 of the housing cover 12 overhangs the wall 10 (see FIGS. 4 and 5).

The purpose of the ring 20 projecting beyond the overhanging edge 25 of the cover 12 may be seen clearly in FIG. 7. In this figure, instead of the housing being connected to a conduit 14, it is mounted on a support panel 28 which may be the side wall of an electrical junction box or any other piece of equipment. Electrical conductors 13a, from the equipment, supplies power to the solenoid within the housing. The panel 28 is provided with a hole 29, and to mount the housing against the panel the hole 15 in housing wall 10 and hole 29 are brought into alignment and a hollow cylindrical fitting 30 having an external thread is placed through the holes. The threads of fitting 30 cooperate with the ring 19, and the fitting is rotated until the outwardly projecting flange 31 at one end of the fitting contacts the inner face of panel 28, assuming the housing is mounted against the outer face.

It will be appreciated from FIG. 7 that as the fitting 30 is tightened within ring 19, the ring 20 is pressed against the outer face of panel 28 but the edge 25 of housing cover 12 does not engage the panel. Thus, there is no pressure on the cover. This is important where, as in the case of a solenoid housing, the core tube of the solenoid is accommodated within aligned holes in the cover 12 and floor 11. Any shifting of the cover with respect to the floor, such as could result from engagement between the overhang 25 and the panel 28, might disorient the core tube thereby causing the armature which slides within it to become jammed. By virtue of the present nut, threaded engagement between the fitting 30 and ring 19 causes the rings 19 and 20, wall 10, panel 28, and flange 31 to be drawn tightly together. Consequently, the inherent resilience of the ring 20 and its rim 24 causes it to act as a lock washer and minimize the chance of accidental rotation between the fitting 30 and ring 19 tending to loosen the connection.

The nut is assembled with the wall 10, before the cover 12 is placed on the wall 10 and floor 11, by first holding the nut above the upper edge of the wall. The nut is oriented so that the rings 19 and 20 are in planes parallel to the wall 10 on opposite sides of the wall, and the web 21 is on top. The nut is then moved downwardly so that the tab 23 passes through the slot 16 and the rings sandwich the wall 10 between them. Downward movement continues until the tab 23 seats on the lower edge of hole 15. In this condition, web 21 is located within the slot 21 and engagement of the web with the sides of the slot prevents rotation of the rings with respect to the wall 10. The cover is then put in place to close and complete the housing. It will be appreciated that since the nut is prevented from rotating, access to the interior of the housing is not necessary when a threaded fitting, such as conduit 14 or fitting 30, is screwed into the ring 19. Thus, the housing need not be opened when it is being connected to another piece of equipment.

It will also be seen that upon connection of the housing to a threaded fitting the nut automatically serves as an electrical ground connection for the housing.

The invention has been shown and described in preferred form only, and by way of example, and many variations may be made in the invention which will still be comprised within its spirit.

What is claimed is:

1. In a housing having a wall within which a threaded fitting is to be secured, said housing having a cover which overhangs said wall, a hole in said wall adapted to accommodate the fitting, and means for threadably engaging the fitting, said means comprising a ring adjacent to the inner face of said wall and surrounding said hole, the inner annular edge of said ring being formed with a screw thread, a ring adjacent to the outer face of said wall and surrounding said hole, said outer ring having a portion spaced outwardly from said wall to a point beyond said overhang, and means joining said rings.

2. An arrangement as defined in claim 1 wherein said outer ring has an annular face portion, and a rim projecting inwardly from the periphery of said face portion, said rim engaging the outer surface of said wall and serving to space said face portion from said wall.

3. An arrangement as defined in claim 1 including an indentation in one edge of said wall, and an element carried by at least one of said rings located within said indentation for preventing rotation of said inner ring.

4. An arrangement as defined in claim 3 wherein said means for joining said rings is an integral web extending between them, said web being said element located within said indentation.

5. An arrangement as defined in claim 1 including a tab projecting from the inner annular edge of one of said rings toward the other, said tab engaging the edge of said hole.

6. An arrangement as defined in claim 5 wherein said joining means is a web extending between the outer edges of said rings, said rings, web, and tab being integrally formed of stamped metal.

References Cited

UNITED STATES PATENTS

| | | | |
|---|---|---|---|
| 1,472,794 | 11/1923 | Foley | 285—206 X |
| 2,518,426 | 8/1950 | Kinander | 285—206 |

THOMAS F. CALLAGHAN, *Primary Examiner.*

U.S. Cl. X.R.

151—41.75; 174—65; 339—199